US006941401B2

(12) United States Patent
Kobayashi et al.

(10) Patent No.: US 6,941,401 B2
(45) Date of Patent: Sep. 6, 2005

(54) INFORMATION PROCESSING APPARATUS AND FOR-USE-ON-MAIN-APPARATUS-BODY IDENTIFIER PRODUCTION METHOD THEREFOR

(75) Inventors: Takashi Kobayashi, Osaka (JP); Hiroyuki Okada, Hyogo (JP); Koichi Satake, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 467 days.

(21) Appl. No.: 09/813,864

(22) Filed: Mar. 22, 2001

(65) Prior Publication Data

US 2004/0225795 A1 Nov. 11, 2004

(30) Foreign Application Priority Data

Nov. 15, 2000 (JP) .................................... P2000-347815

(51) Int. Cl.[7] ................................................ G06F 7/10

(52) U.S. Cl. ....................... 710/301; 710/302; 710/100; 709/221; 709/222

(58) Field of Search ................................ 710/301–304, 710/100; 361/142, 719; 709/249, 221–224

(56) References Cited

U.S. PATENT DOCUMENTS 5,594,873 A * 1/1997 Garrett ....................... 710/300
6,192,417 B1 * 2/2001 Block et al. ................ 709/249
6,199,752 B1 * 3/2001 Bornemann et al. ........ 235/375
6,327,635 B1 * 12/2001 Alston et al. ............... 710/301
6,363,423 B1 * 3/2002 Chiles et al. ............... 709/224
6,363,452 B1 * 3/2002 Lach .......................... 710/316
6,418,492 B1 * 7/2002 Papa et al. .................. 710/302
6,421,755 B1 * 7/2002 Rao ........................... 710/302
6,429,967 B1 * 8/2002 Amos ......................... 359/381
6,477,602 B1 * 11/2002 Loison ....................... 710/301
6,549,967 B1 * 4/2003 McTague .................... 710/302
6,591,324 B1 * 7/2003 Chen et al. ................. 710/302
2002/0045378 A1 * 4/2002 Johnson et al. ............. 439/381
2002/0057799 A1 * 5/2002 Kohno ....................... 380/228

FOREIGN PATENT DOCUMENTS

JP 2001076203 A * 9/1999 ............ G06K/7/12

OTHER PUBLICATIONS

Multisensorial modular system of monitoring and tracking information fusion techniques and neural networks, Javier Dran de Jesus, IEEE 33rd Annual 1999 International Carnahan Conference on Oct. 5–7, 1999 Page(s):59–66.*

Maintaining useful server throughput under load attacks NIC portalsGlobal Telecommunications Conference, 2004. GLOBECOM '04. IEEE Publication Date: Nov. 29–Dec. 3, 2004 vol.: 4 On page(s): 2140–2145 vol. 4.*

* cited by examiner

*Primary Examiner*—Mark H. Rinehart
*Assistant Examiner*—Kim T. Huynh
(74) *Attorney, Agent, or Firm*—McDermott Will & Emery LLP

(57) ABSTRACT

Disclosed are an information processing apparatus and an identifying method therefor that are used on a network. With preferential use of the identifier of a network card, the degree of demountability of that is the lowest, there is produced an identifier of the information processing apparatus. As a result of this, it is possible to minimize the changing of the identifier of the information processing apparatus.

4 Claims, 5 Drawing Sheets

S601 Power "on"
S602 X's been continuously used for a prescribed, or greater than prescribed, length of time? Yes / No
S603 Y's been continuously used for a prescribed, or greater than prescribed, length of time? Yes / No
S604 Using identifier of card presently in use, produces an apparatus identifier
S605 Use identifier of Y
S606 Use identifier of X
S607 End

INFORMATION PROCESSING APPARATUS AND FOR-USE-ON-MAIN-APPARATUS-BODY IDENTIFIER PRODUCTION METHOD THEREFOR

BACKGROUND OF THE INVENTION

1. Field of the Invention

The present invention relates to an information processing apparatus and a method of identifying the same, which are used on a network.

2. Description of the Related Art

As a method of identifying an information processing apparatus, which is used on a network, there has hitherto been adopted a method of, according to an identifier of the network card that differs every network card mounted on the information processing apparatus, producing a for-use-on-apparatus identifier and, using this identifier for use on the information processing apparatus itself, identifying this information processing apparatus.

Also, with the increase in the level of the function of an information processing apparatus, the apparatus with respect to that a plurality of network cards can be mounted has in recent years been put to practical use. And, a plurality of network cards have come to be used by performing insertion/draw-off of the network cards and thereby changing the construction of these network cards according to the circumstances.

However, in the conventional information processing apparatus, there is no criterion according to which the identifier for use on the apparatus is produced. Therefore, there is the possibility that the identifier of the apparatus will change by adding or deleting the network cards. This raises the problem that the information processing apparatus becomes unable to be identified by the only one identifier on a relevant network.

SUMMARY OF THE INVENTION

Accordingly, a main object of the present invention is to minimize the change in the identifier of the information processing apparatus that follows the addition or deletion of the network cards.

Other objects, features, and advantages of the present invention will become apparent from the following description.

An information processing apparatus according to the present invention has network-card-recognizing means that recognizes network cards that are mounted therein, degree-of-demountability storage means that stores therein the degrees of demountability of the network cards the network-card-recognizing means recognizes, and for-main-apparatus-body identifier production means that, according to the identifier of the network card, the degree of demountability of that is the lowest of all the degrees of demountability, corresponding to the network cards the network-card-recognizing means has recognized, stored in the degree-of-demountability storage means, produces the main-apparatus-body identifier for use on a network. It is to be noted that the demountability is, for example, a facility of structurally detaching a network card or a frequency of uses or a type of card.

A for-use-on-main-apparatus-body identifier production method for an information processing apparatus according to the present invention includes a network-card-recognizing step for recognizing network cards that are mounted therein, a degree-of-demountability storage step for storing the degrees of demountability of the network cards that are recognized in the network-card-recognizing step, and a for-main-apparatus-body identifier production step for, according to the identifier of the network card, the degree of demountability of that is the lowest of all the degrees of demountability, corresponding to the network cards that have been recognized in the network-card-recognizing step, stored in the degree-of-demountability storage step, producing the main-apparatus-body identifier for use on a network. It is to be noted that the demountability is, for example, a facility of structurally detaching a network card or a frequency of uses or a type of card.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

A preferred embodiment of the present invention will be explained with reference to the drawings.

(First Preferred Embodiment of the Present Invention)

Figure 1:
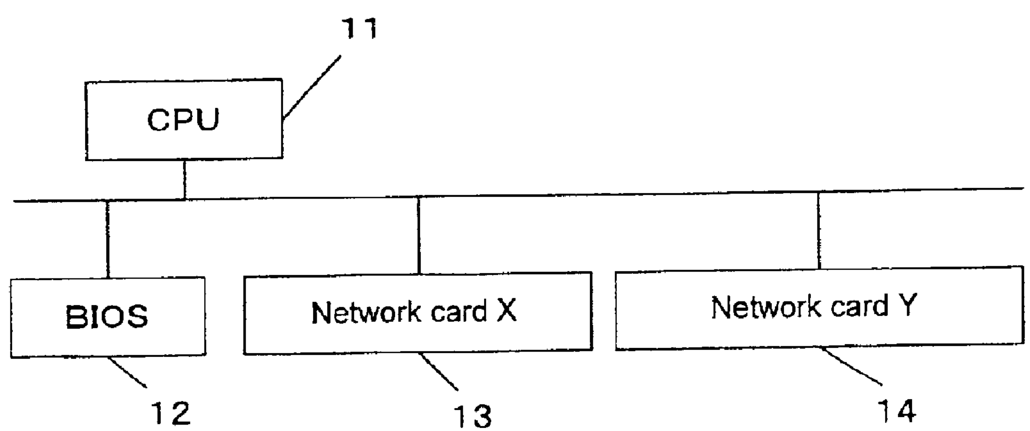
FIG. 1 is a systematic-constructional view illustrating an information processing apparatus according to a first preferred embodiment of the present invention.

FIG. 1 is a systematic-constructional view illustrating an information processing apparatus according to a first preferred embodiment of the present invention.

In FIG. 1, a reference numeral 11 denotes a central processing unit (CPU) that controls the entire information processing apparatus; a reference numeral 13 denotes a network card X that is difficult to demount; a reference numeral 14 denotes a network card Y that is less difficult to demount than the network card X 13; a reference numeral 12 denotes a BIOS that recognizes the existence of the network card X 13 and the network card Y 14. The BIOS has preset therein the degree of demountability that the network card 13 is more difficult to demount than the network card Y 14. The BIOS produces an identifier of the information processing apparatus from an identifier of the network card X 13.

FIG. 2 is a disassembled view illustrating the information processing apparatus according to a first preferred embodiment of the present invention.

Figure 2A:
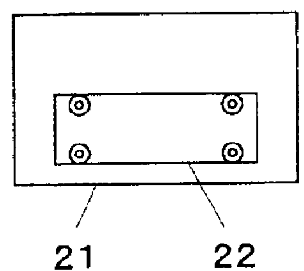
FIG. 2 is a disassembled view illustrating the information processing apparatus according to the first preferred embodiment of the present invention.

FIG. 2A illustrates a reverse surface of the information apparatus; a reference numeral 21 denotes a back cabinet; and a reference numeral 22 denotes a back lid that closes part of the back cabinet 21.

Figure 2B:
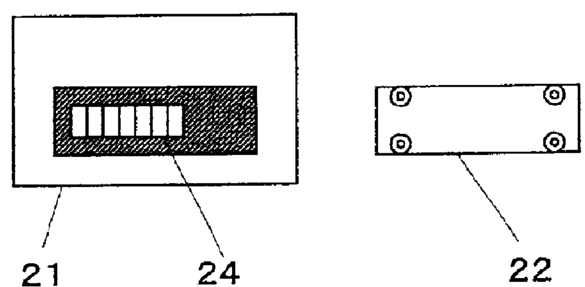

FIG. 2B illustrates a state where the back lid 22 has been demounted from the back cabinet 21. A reference numeral 24 denotes the network card Y that can be demounted from an opening formed at the place from that the back lid 22 has been demounted.

Figure 2C:
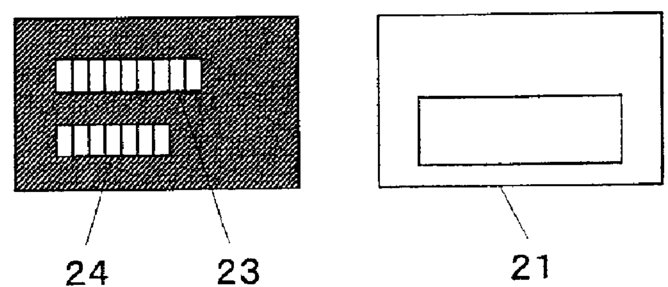

FIG. 2C illustrates a state where the back cabinet 21 has been demounted; and a reference numeral 23 is the network X that cannot be demounted by mere demounting of the back lid 22.

Figure 3:
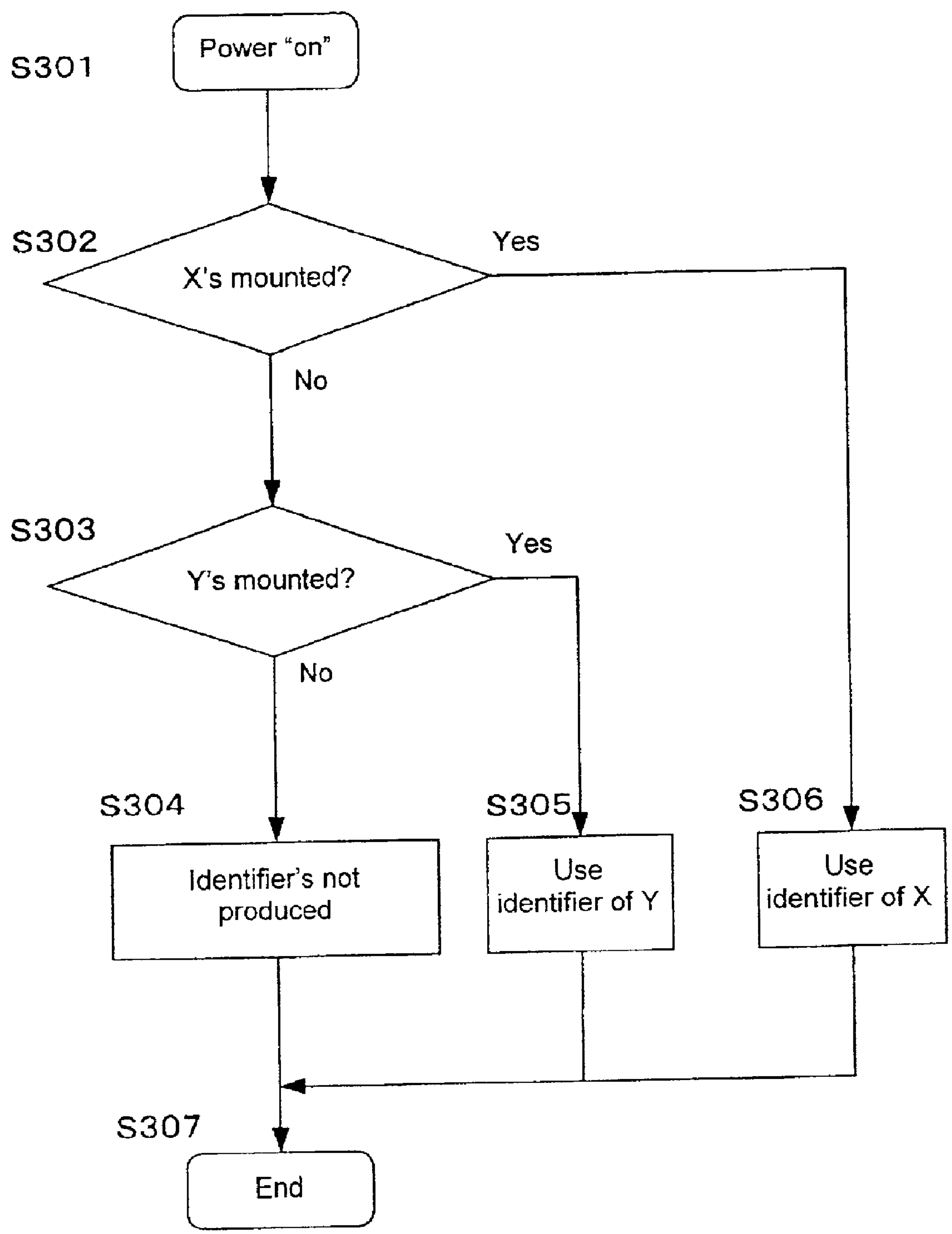
FIG. 3 is a flow chart illustrating an identifier production process for producing an identifier of the information processing apparatus according to the first preferred embodiment of the present invention.

FIG. 3 is a flow chart illustrating an identifier production process for producing an identifier of the information processing apparatus according to the first preferred embodiment of the present invention.

First, when in step S301 the power source of the information processing apparatus is made "on", it is determined in step S302 whether the network card X 23 that is present in the BIOS 12 as the card difficult to demount is being mounted. If being mounted, a transfer is made to a step S306. There, using the identifier of the network card X 23, there is produced the identifier of the information processing apparatus. Unless being mounted, a transfer is made to a step S303.

In a step S303 it is determined whether the network card Y 24 that is preset in the BIOS 12 as the card, that is less difficult to demount and that is next to the network card X 23 in the difficulty of demounting, is being mounted. If being mounted, a transfer is made to a step S305. There, using the identifier of the network card Y 24, the identifier of the information processing apparatus is produced. Unless being mounted, a transfer is made to a step S304.

In step S304, it is determined that not a network card at all is being mounted, whereby the identifier of the information processing apparatus is not produced, the flow being terminated.

(Second Preferred Embodiment of the Present Invention)

Figure 4:
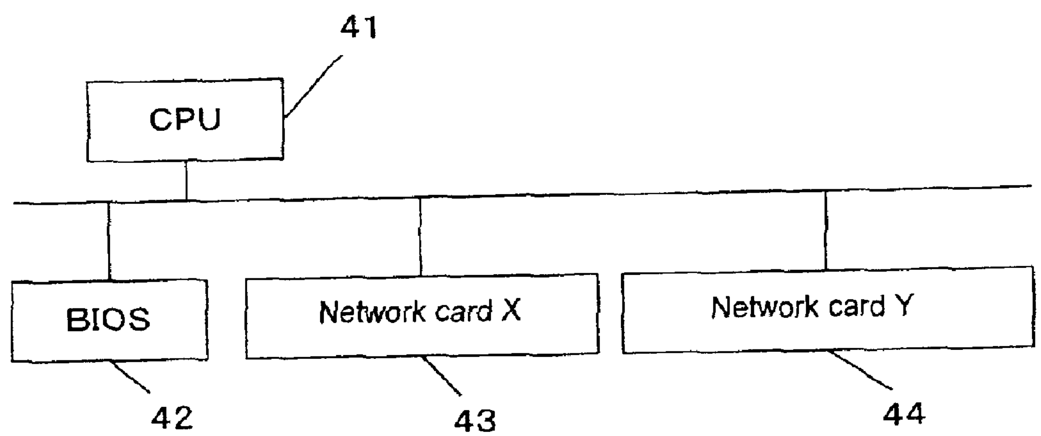
FIG. 4 is a systematic-constructional view illustrating the information processing apparatus according to a second preferred embodiment of the present invention.

FIG. 4 is a systematic-constructional view illustrating the information processing apparatus according to a second preferred embodiment of the present invention.

In FIG. 4, a reference numeral 41 denotes a central processing unit (CPU) that controls the entire information processing apparatus; a reference numeral 43 denotes a network card X; a reference numeral 44 denotes a network card Y; and a reference numeral 42 denotes a BIOS. The BIOS recognizes the existence of each of the network card X 43 and network card Y 44. It thereby determines whether the length of use time in that each of the network card X 43 and network card Y 44 continues to be used is equal to or greater than a preset prescribed length of time. It thereby produces the identifier of the information processing apparatus from the identifier of the network card X43 in case the length of continuous-use time of the network card X43 for example is equal to greater than the prescribed length of time.

Figure 5:
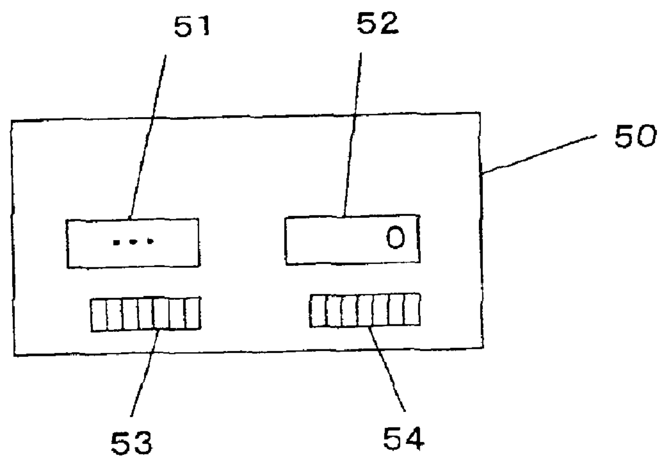
FIG. 5 is a front view illustrating the information processing apparatus according to the second preferred embodiment of the present invention.

FIG. 5 is a front view of the information processing apparatus according to the second preferred embodiment of the present invention.

The information processing apparatus comprises a cabinet 50, the front surface of that is equipped with slots that have mounted thereon respectively the network card X 53 and the network card Y 54. The front surface is also provided, in the vicinities of the slots, with display portions 51 and 52 that display the lengths of continuous-use time of the network card X 53 and the network card Y 54, respectively.

For example, when the network card X 53 is being used, this length of continuous-use time is displayed on the display portion 51 and "zero" is displayed at the display portion 52 that corresponds to the network card Y 54.

Figure 6:
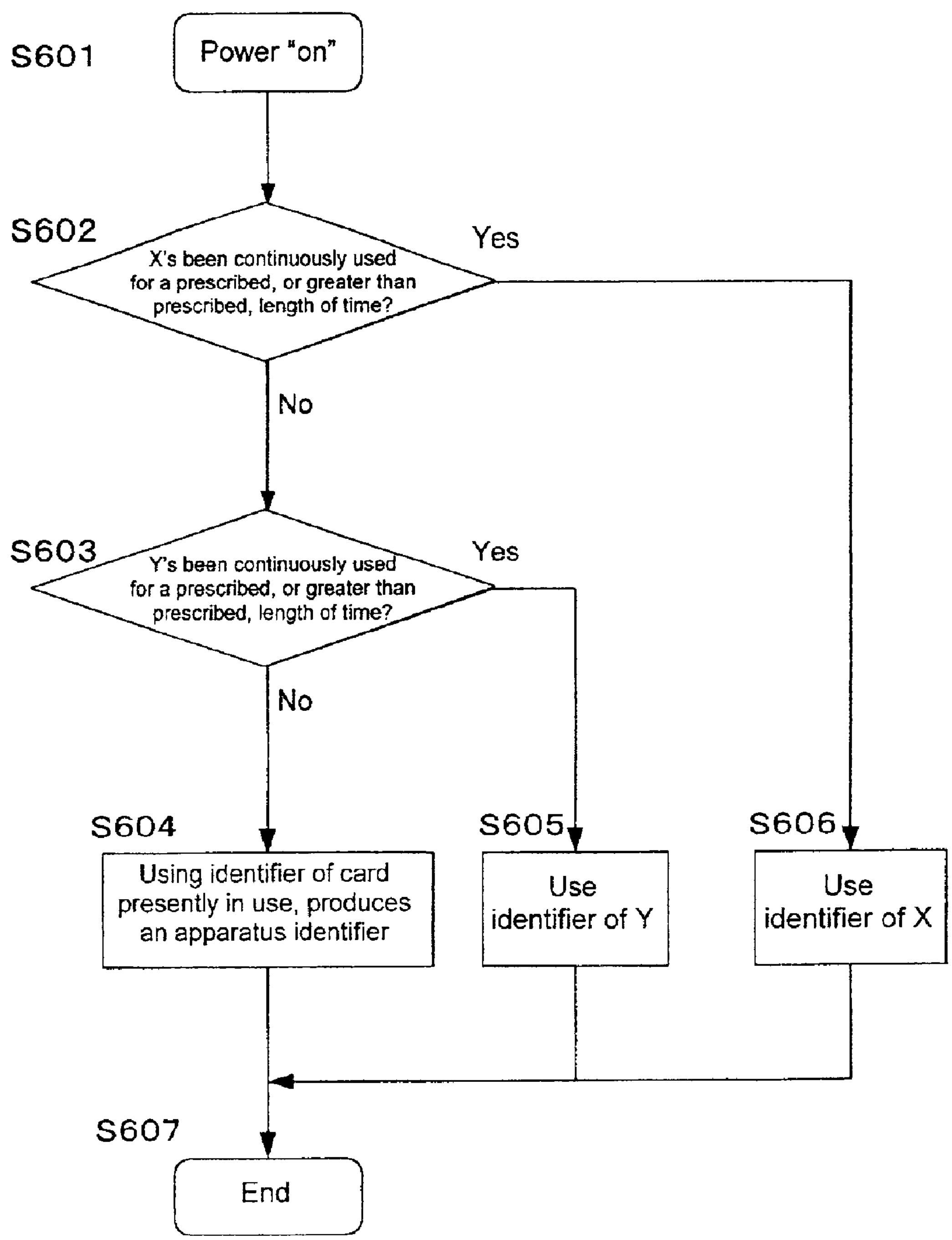
FIG. 6 is a flow chart illustrating the identifier production process for producing an identifier of the information processing apparatus according to the second preferred embodiment of the present invention.

FIG. 6 is a flow chart illustrating the identifier production process for producing an identifier of the information processing apparatus according to the second preferred embodiment of the present invention.

First, when in step S601 the power source of the information processing apparatus is made "on", it is determined in step S602 whether the network card X 53 is at present being used and the length of continuous use thereof is equal to or greater than a prescribed length of time that is preset in the BIOS 42. As a result of this, in case it has been being continuously used for the prescribed, or greater than prescribed, length of time, a transfer is made to step S606. There, using the identifier of the network card X 53, there is produced the identifier of the information processing apparatus. In case the network card X 53 is not being used or has been being out of use for the prescribed, or greater than prescribed, length of time, a transfer is made to step S603.

In step S603 it is determined whether the network card Y 54 is at present being used and the length of continuous use thereof is equal to or greater than a prescribed length of time that is preset in the BIOS 42. As a result of this determination, in case it has been being continuously used for the prescribed, or greater than prescribed, length of time, a transfer is made to step S605. There, using the identifier of the network card Y 54, there is produced the identifier of the information processing apparatus. In case the network card Y 54 is not being used or has been being out of use for the prescribed, or greater than prescribed, length of time, a transfer is made to step S604.

In step S604, using the identifier of the network card that is presently being used, there is produced the identifier of the information processing apparatus, the flow being terminated. Or, in case it has been determined that not a network card at all is being mounted, the flow is terminated without producing any identifier of the information processing apparatus.

Additionally, in the above-described preferred embodiments of the present invention, as the criteria each for determining the degree of demountability by which the network card can be demounted there have been used to what degree the network card is structurally difficult to demount (for example, the number of steps for performing relevant disassembling, the required length of time for performing relevant disassembling, the number of screws that at the time of relevant disassembling must be removed, the number of cables that at the time of relevant disassembling must be drawn off, etc.), and the use frequency of each network card (for example, how many times the continuous uses thereof each of that corresponds to a prescribed, or greater than prescribed, length of time have been made, etc.) However, in addition to such criteria, there can be used any type of criterion concerning the degree of demountability, such as, for example, the type of the network card (for example, in case a wireless LAN card and a wire LAN card are mounted, the wire LAN card requires the use of a larger amount of time and labor for insertion and draw-off of the cable than the wireless LAN card. Therefore, the identifier of the information processing apparatus is produced according to the identifier of the wire LAN card).

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An information processing apparatus, comprising:

a network-card-recognizing device that recognizes a plurality of network cards mounted therein;

a degree-of-demountability storage device that stores therein the degrees of demountability of the plurality of network cards recognized by the network-card-recognizing device; and an information processing apparatus identifier production device that produces an identifier for the information processing apparatus based on an identifier of a network card having the lowest degree of demountability among the plurality of network cards stored in the degree-of-demountability storage device.

2. The information processing apparatus according to claim 1, wherein the demountability is a facility of structurally detaching a network card, a frequency of uses, or a type of card.

3. An information processing apparatus identifier production method for an information processing apparatus, comprising:

a network-card-recognizing step for recognizing a plurality of network cards;

a degree-of-demountability storage step for storing the degrees of demountability of the plurality of network cards that are recognized in the network-card-recognizing step; and an information processing apparatus identifier production step for producing an identifier for the information processing apparatus based on an identifier of a network card having the lowest degree of demountability among the plurality of network cards stored in the degree-of-demountability storage step.

4. The information processing apparatus identifier production method for an information processing apparatus according to claim 3, wherein the demountability is a facility of structurally detaching a network card, a frequency of uses, or a type of card.

* * * * *